US012764779B2

(12) United States Patent
Jiang et al.

(10) Patent No.: US 12,764,779 B2
(45) Date of Patent: Oct. 13, 2026

(54) UPLINK SIGNAL SENDING AND RECEIVING METHOD AND APPARATUS

(71) Applicant: 1FINITY Inc., Kawasaki (JP)

(72) Inventors: Qinyan Jiang, Beijing (CN); Lei Zhang, Beijing (CN); Zhe Chen, Beijing (CN); Xin Wang, Beijing (CN); Jian Zhang, Beijing (CN); Junrong Gu, Beijing (CN)

(73) Assignee: 1FINITY Inc., Kawasaki (JP)

(*) Notice: Subject to any disclaimer, the term of this patent is extended or adjusted under 35 U.S.C. 154(b) by 510 days.

(21) Appl. No.: 18/099,314

(22) Filed: Jan. 20, 2023

(65) Prior Publication Data

US 2023/0156779 A1 May 18, 2023

Related U.S. Application Data

(63) Continuation of application No. PCT/CN2020/107576, filed on Aug. 6, 2020.

(51) Int. Cl.

*H04W 74/00* (2009.01)
*H04W 74/04* (2009.01)
*H04W 74/0808* (2024.01)

(52) U.S. Cl.

CPC ......... *H04W 74/002* (2013.01); *H04W 74/04* (2013.01); *H04W 74/0808* (2013.01)

(58) Field of Classification Search

CPC . H04W 72/23; H04W 74/002; H04W 74/006; H04W 74/04; H04W 74/0808

See application file for complete search history.

(56) References Cited

U.S. PATENT DOCUMENTS

| | | | | |
|---|---|---|---|---|
| 2017/0339717 A1* | 11/2017 | Futaki | ................... | H04W 76/27 |
| 2019/0230670 A1 | 7/2019 | Zhang et al. | | |
| 2019/0261255 A1 | 8/2019 | You | | |
| 2019/0261412 A1 | 8/2019 | Novlan et al. | | |
| 2020/0045738 A1* | 2/2020 | Oh | .................... | H04W 72/1263 |
| 2020/0228995 A1 | 7/2020 | Yang et al. | | |

(Continued)

FOREIGN PATENT DOCUMENTS

| | | |
|---|---|---|
| CN | 107113801 A | 8/2017 |
| CN | 108024310 A | 5/2018 |

(Continued)

OTHER PUBLICATIONS

Decision of Refusal and Decision of Dismissal of Amendment issued by the Japan Patent Office for corresponding Japanese Patent Application No. 2023-505729, mailed on Aug. 20, 2024 with an English translation.

(Continued)

*Primary Examiner* — Kashif Siddiqui
(74) *Attorney, Agent, or Firm* — Myers Wolin, LLC

(57) ABSTRACT

Methods and apparatuses for transmitting and receiving uplink signals. The method for transmitting includes: receiving by a terminal equipment a first signal transmitted by a network device, the first signal being at least used for the terminal equipment to determine whether to perform channel detection and/or how to perform channel detection before transmitting a second signal; and transmitting the second signal by the terminal equipment to the network device by using an uplink resource.

15 Claims, 8 Drawing Sheets

(56) References Cited

U.S. PATENT DOCUMENTS

| | | | | |
|---|---|---|---|---|
| 2020/0383054 | A1 | 12/2020 | Tang | |
| 2021/0076448 | A1* | 3/2021 | Koskela | H04B 7/0695 |
| 2021/0289548 | A1* | 9/2021 | Murray | H04W 74/0808 |
| 2021/0337409 | A1 | 10/2021 | Xue et al. | |
| 2021/0352728 | A1* | 11/2021 | Zhang | H04W 72/0453 |
| 2022/0078824 | A1 | 3/2022 | Zhu | |
| 2022/0287094 | A1* | 9/2022 | Tooher | H04L 5/0082 |
| 2023/0300878 | A1* | 9/2023 | Sun | H04W 74/0808 370/329 |

FOREIGN PATENT DOCUMENTS

| | | | |
|---|---|---|---|
| CN | 109302744 | A | 2/2019 |
| CN | 109429551 | A | 3/2019 |
| CN | 109792747 | A | 5/2019 |
| CN | 110391885 | A | 10/2019 |
| CN | 110912662 | A | 3/2020 |
| CN | 111108800 | A | 5/2020 |
| CN | 111436095 | A | 7/2020 |
| CN | 111436102 | A | 7/2020 |
| WO | 2016/072784 | A1 | 5/2016 |
| WO | 2016/103533 | A1 | 6/2016 |
| WO | 2018/025070 | A1 | 2/2018 |
| WO | 2018/201397 | A1 | 11/2018 |
| WO | 2020/150957 | A1 | 7/2020 |

OTHER PUBLICATIONS

CATT, “Channel Access Mechanism in support”, Agenda Item: 8.1.2, 3GPP TSG-RAN WG1 #101, R1-2003637, e-Meeting, May 25-Jun. 5, 2020.

OPPO, “Discussion on channel access mechanism for above 52.6GHz”, Agenda Item: 8.1.2, 3GPP TSG-RAN WG1 #101-E, R1-2004097, May 25-Jun. 5, 2020.

The First Examination Report issued by the Patent Office of India for corresponding Indian Patent Application No. 202337002510, mailed on Nov. 1, 2023, with an English translation.

First Notification of Office Action and Search Report issued by the China National Intellectual Property Administration for corresponding Chinese Patent Application No. 202080102703.9, mailed on Feb. 12, 2025, with an English translation.

Huawei et al., “Maintenance on uplink signals and channels”, Agenda Item: 7.2.2.1.3, 3GPP TSG RAN WG1 Meeting #100bis-e, R1-2001533, E-meeting, Apr. 20-30, 2020, cited in CNOA.

Interdigital Inc., “Design aspects of NR-U uplink signals and channels”, Agenda Item: 7.2.2.3.2, 3GPP TSG RAN WG1 Meeting #94bis, R1-1811203, Chengdu, China, Oct. 8-12, 2018, cited in CNOA.

Huawei et al., “Initial access signal and channels in NR unlicensed band”, Agenda Item: 7.2.2.1.1, 3GPP TSG RAN WG1 Meeting #99, R1-1911863, Reno, Nevada, USA, Nov. 18-22, 2019, cited in CNOA.

The Extended European search report with the Supplementary European search report and the European search opinion, issued by the European Patent Office for corresponding European Patent Application No. 20948348.6-1216, mailed on Aug. 30, 2023.

Notice of Reasons for Refusal issued by the Japan Patent Office for corresponding Japanese Patent Application No. 2023-505729, mailed on Feb. 6, 2024, with an English translation.

International Search Report and Written Opinion of the International Searching Authority issued by the China National Intellectual Property Administration for corresponding International Patent Application No. PCT/CN2020/107576, mailed on Apr. 27, 2021, with an English translation.

Notice of Preliminary Rejection issued by the Korean Intellectual Property Office for corresponding Korean Patent Application No. 10-2023-7003219, mailed on Apr. 22, 2025, with an English translation.

* cited by examiner

UPLINK SIGNAL SENDING AND RECEIVING METHOD AND APPARATUS

CROSS-REFERENCE TO RELATED APPLICATION

This application is a continuation application of International Application PCT/CN2020/107576 filed on Aug. 6, 2020 and designated the U.S., the entire contents of which are incorporated herein by reference.

TECHNICAL FIELD

This disclosure relates to the field of communication technologies.

BACKGROUND

Currently, standardization of new radio (NR) Rel-15 and Rel-16 has been basically completed in 3GPP. An NR system is able to support operations at the following frequency ranges (including FR1 and FR2).

| Frequency range designation | Corresponding frequency range |
|---|---|
| FR1 | 410 MHz-7125 MHz |
| FR2 | 24250 MHz-52600 MHz |

The concept of bandwidth part (BWP) is introduced into the NR, which supports multiple types of subcarrier spacings (SCSs). On a downlink/uplink (DL/UL) carrier, a network device (such as a base station) may preconfigure one or more downlink/uplink (DL/UL) BWPs for a terminal equipment and configure an SCS respectively for each of the BWPs. Different SCSs may be configured for different BWPs, and the SCSs may be of 15 kHz, 30 kHz, 60 kHz and 120 kHz.

The terminal equipment may work with an active BWP, and may switch BWPs according to signaling, such as a radio resource control (RRC) message, and downlink control information (DCI), or according to a timer state, etc.

For a UL, an SCS of a physical uplink shared channel (PUSCH), or a physical uplink control channel (PUCCH), or a sounding reference signal (SRS) on a UL BWP is an SCS of the UL BWP, while an SCS of a physical random access channel (PRACH) thereon may be identical to or different from the SCS of the UL BWP; and the SCS of PRACH is additionally configured by a network device (such as a base station).

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that how to support NR to work at higher frequencies (i.e. frequencies higher than 52.6 GHz, such as frequencies in a range of 52.6-71 GHz) is studied in 3GPP. However, there is currently no corresponding method (including methods for transmitting and receiving uplink signals) supporting the NR to work at higher frequencies.

The above higher frequencies may be unlicensed spectra (or referred to as shared spectra) or licensed spectra; and on the other hand, for the unlicensed spectra, regulatory requirements on spectrum uses in different countries or regions may be different. For example, some countries or regions impose channel detection, such as being referred to as LBT (listen before talk) or CCA (clear channel assessment), while some countries or regions have no such requirements. In addition, in some scenarios, such as in a case where non-coexistence of other technologies or systems or devices is ensured in some ways, use of LBT may lead to unnecessary power consumption and reduce resource utilization and system throughput.

That is, in order to support the NR to work at the above higher frequencies, methods for transmitting and receiving uplink signals need to be flexibly applicable to different scenarios. In addition, in order to save power of a terminal equipment and improve resource utilization and throughput, it is necessary to avoid unnecessary channel detection by the terminal equipment as much as possible.

In order to solve at least one of the above problems, embodiments of this disclosure provide methods and apparatuses for transmitting and receiving uplink signals.

According to an aspect of the embodiments of this disclosure, there is provided a method for transmitting an uplink signal, including:

- receiving by a terminal equipment a first signal transmitted by a network device, the first signal being at least used for the terminal equipment to determine whether to perform channel detection and/or how to perform channel detection before transmitting a second signal; and
- transmitting the second signal by the terminal equipment to the network device by using an uplink resource.

According to another aspect of the embodiments of this disclosure, there is provided an apparatus for transmitting an uplink signal, including:

- a receiving unit configured to receive a first signal transmitted by a network device, the first signal being at least used for the terminal equipment to determine whether to perform channel detection and/or how to perform channel detection before transmitting a second signal; and
- a transmitting unit configured to transmit the second signal to the network device by using an uplink resource.

According to a further aspect of the embodiments of this disclosure, there is provided a method for receiving an uplink signal, including:

- transmitting a first signal by a network device to a terminal equipment, the first signal being at least used for the terminal equipment to determine whether to perform channel detection and/or how to perform channel detection before transmitting a second signal; and
- receiving by the network device the second signal transmitted by the terminal equipment by using an uplink resource.

According to still another aspect of the embodiments of this disclosure, there is provided an apparatus for receiving an uplink signal, configured in a network device, including:

- a transmitting unit configured to transmit a first signal to a terminal equipment, the first signal being at least used for the terminal equipment to determine whether to perform channel detection and/or how to perform channel detection before transmitting a second signal; and a receiving unit configured to receive the second signal transmitted by the terminal equipment by using an uplink resource.

An advantage of the embodiments of this disclosure exists in that the terminal equipment receives the first signal transmitted by the network device, the first signal being at least used for the terminal equipment to determine whether to perform channel detection and/or how to perform channel detection before transmitting a second signal, and the terminal equipment transmits the second signal to the network device by using an uplink resource. Hence, the NR may be supported to perform uplink transmission at higher frequencies, and network device is able to flexibly control the terminal equipment to perform or not to perform channel detection and/or how the terminal equipment performs channel detection, which are applicable to various scenarios, unnecessary channel detection may be avoided as much as possible, thereby saving power of the terminal equipment and improving resource utilization and throughput.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment may be combined with elements and features depicted in one or more additional drawings or embodiments. Moreover, in the drawings, like reference numerals designate corresponding parts throughout the several views and may be used to designate like or similar parts in more than one embodiments.

DETAILED DESCRIPTION

Figure 1:
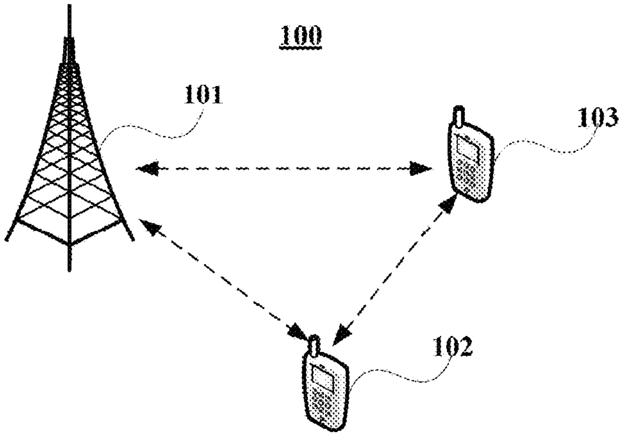
FIG. 1 is schematic diagram of a communication system of an embodiment of this disclosure.

These and further aspects and features of this disclosure will be apparent with reference to the following description and attached drawings. In the description and drawings, particular embodiments have been disclosed in detail as being indicative of some of the ways in which the principles herein may be employed, but it is understood that the invention is not limited correspondingly in scope. Rather, the invention includes all changes, modifications and equivalents coming within the terms of the appended claims.

In the embodiments of this disclosure, terms "first," and "second," etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term. Terms "cell" and "base station" are interchangeable, without causing confusion.

In the embodiments of this disclosure, the term "user equipment (UE)" or "terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipment described above. "Device" may refer to a network device, or may refer to a terminal equipment, unless otherwise specified.

Scenarios in the embodiments of this disclosure shall be described below by way of examples; however, this disclosure is not limited thereto.

FIG. 1 is a schematic diagram of a communication system of an embodiment of this disclosure, in which a case where terminal equipment and a network device are taken as examples is schematically shown. As shown in FIG. 1, the communication system 100 may include a network device 101 and terminal equipment 102, 103. For the sake of simplicity, an example having only two terminal equipment and one network device is schematically given in FIG. 1; however, the embodiment of this disclosure is not limited thereto.

In the embodiment of this disclosure, existing services or services that may be implemented in the future may be performed between the network device 101 and the terminal equipment 102, 103. For example, such services may include but not limited to an enhanced mobile broadband (eMBB), massive machine type communication (MTC), and ultra-reliable and low-latency communication (URLLC), etc.

It should be noted that FIG. 1 shows that two terminal equipment 102, 103 are both within coverage of the network device 101. However, this disclosure is not limited thereto, and the two terminal equipment 102, 103 may not be within the coverage of the network device 101, or one terminal equipment 102 is within the coverage of the network device 101 and the other terminal equipment 103 is outside the coverage of the network device 101.

In the following description, without causing confusion, terms "uplink control signal" and "uplink control information (UCI)" or "physical uplink control channel (PUCCH)" or "PUSCH transmission" are interchangeable, and terms "uplink data signal" and "uplink data information" or "physical uplink shared channel (PUSCH)" or "PUCCH transmission" are interchangeable;

terms "random access channel (RACH)" and "physical random access channel (PRACH)" or "preamble" or "PRACH transmission" are interchangeable, and terms "SRS" and "SRS transmission" are interchangeable;

terms "downlink control signal" and "downlink control information (DCI)" or "physical downlink control channel (PDCCH)" are interchangeable, and terms "downlink data signal" and "downlink data information" or "physical downlink shared channel" are interchangeable.

In addition, transmitting or receiving a PUSCH may be understood as transmitting or receiving uplink data information carried by the PUSCH, and transmitting or receiving a PUCCH may be understood as transmitting or receiving uplink control information carried by the PUCCH, transmitting or receiving a PRACH may be understood as transmitting or receiving a preamble carried by the PRACH; uplink signals may include uplink data signals and/or uplink control signals and/or uplink reference signals (such as a DMRS, a PT-TS, and an SRS) and/or random access channels, etc., which may also be referred to as uplink transmissions (UL transmissions) or uplink information or uplink channels. And transmitting an uplink signal on an uplink resource may be understood as transmitting the uplink signal by using the uplink resource.

In the embodiment of this disclosure, higher-layer signaling may be, for example, radio resource control (RRC) signaling or media access control (MAC) signaling, wherein the RRC signaling is, for example, an RRC message, and the MAC signaling is, for example, an MAC CE (MAC control element). However, this disclosure is not limited thereto. An RRC message transmitted by a base station, for example, may include a broadcast RRC message and/or a dedicated RRC message.

The broadcast RRC message is, for example, an RRC message periodically broadcast by the base station, such as an RRC message included in BCCH-BCH-Message (class), e.g. a main information block (MIB), etc., or an RRC message included in BCCH-DL-SCH-Message (class), such as SIB1 (or referred to as RMSI), SystemInformation, etc.

The dedicated RRC message is, for example, an RRC message transmitted by a BTS to a specific UE, such as an RRC message included in DL-CCCH-Message (class), e.g. RRCSetup, etc., or an RRC message included in DL-DCCH-Message (class), such as RRCReconfiguration, RRCResume, RRCReestablishment, and SystemInformation, etc.

An RRC message may include one or more RRC IEs (RRC information elements) or one or more information fields, and an RRC IE may further include one or more other RRC IEs or information fields.

In the embodiments of this disclosure, physical layer signaling may be, for example, DCI (downlink control information) or UCI (uplink control information).

Embodiments of a First Aspect

Figure 2:
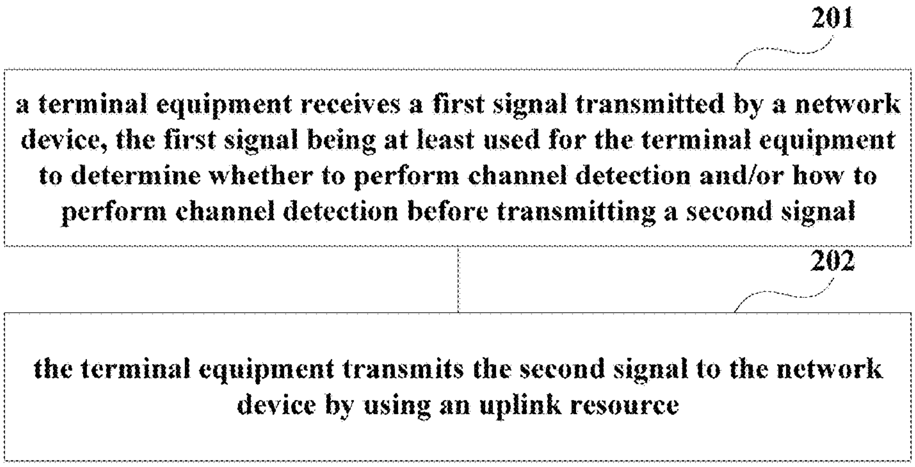
FIG. 2 is a schematic diagram of the method for transmitting an uplink signal of an embodiment of this disclosure.

The embodiments of this disclosure provide a method for transmitting an uplink signal, which shall be described from a terminal equipment. FIG. 2 is a schematic diagram of the method for transmitting an uplink signal of an embodiment of this disclosure. As shown in FIG. 2, the method includes:

201: a terminal equipment receives a first signal transmitted by a network device, the first signal being at least used for the terminal equipment to determine whether to perform channel detection and/or how to perform channel detection before transmitting a second signal; and

202: the terminal equipment transmits the second signal to the network device by using an uplink resource.

It should be noted that FIG. 2 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 2.

In some embodiments, the first signal includes at least one of the following: a synchronization signal block (SSB), a radio resource control (RRC) message, a media access control (MAC) control element (CE), downlink control information (DCI), or a random access response (RAR); however, this disclosure is not limited thereto. When the first signal includes two or more of the above, each of them may or may not be transmitted simultaneously.

In some embodiments, that the terminal equipment determines whether to perform channel detection before transmitting a second signal includes: determining by the terminal equipment not to perform channel detection before transmitting the second signal, or determining by the terminal equipment to perform channel detection before transmitting the second signal.

In some embodiments, that the terminal equipment determines how to perform channel detection before transmitting a second signal includes: determining by the terminal equipment a length of time of channel detection performed before transmitting the second signal; and/or, determining by the terminal equipment a type of channel access of channel detection performed before transmitting the second signal; and/or, determining by the terminal equipment a priority of channel access of channel detection performed before transmitting the second signal. The determining by the terminal equipment a length of time of channel detection performed before transmitting the second signal may include determining or generating by the terminal equipment a value of a random number used for performing the channel detection.

In some embodiments, the first signal may be used to instruct the terminal equipment to perform channel detection before transmitting the second signal, or the first signal may be used to instruct the terminal equipment not to perform channel detection before transmitting the second signal.

In some embodiments, the first signal may be used to instruct the terminal equipment how to perform channel detection before transmitting the second signal. For example, it may be used to instruct the terminal equipment to perform at least one of the following of channel detection before transmitting the second signal: a length of time for channel detection; a value of a random number used for channel detection; a value of a first parameter (such as a contention window (CW)) for generating a random number for channel detection; a value range of a first parameter for generating a random number for channel detection; a channel access type; a channel access priority; and channel access modes.

In some embodiments, the first signal is used to indicate an operating band.

For example, the terminal equipment may determine the length of time of the channel detection according to the indicated value of the random number, or generate the random number according to the indicated value of the CW, and then determine the length of time of the channel detection, or generate the random number according to a value range of the indicated CW by using one of values therein, and then determine the length of time of the channel detection.

For another example, the terminal equipment may determine the type of channel access according to the instruction of the first signal, or may determine the priority of channel access according to the instruction, or may determine the channel access modes according to the instruction.

In some embodiments, the terminal equipment may transmit the second signal to the network device by using the uplink resource, including: transmitting the second signal without channel detection by the terminal equipment when the terminal equipment determines that the second signal is transmitted without channel detection; otherwise, performing channel detection by the terminal equipment before transmitting the second signal, and transmitting the second signal only when it detects that the channel is idle. The uplink resource may be on a licensed band, or may also be on an unlicensed band.

In some embodiments, the first signal is a synchronization signal block (SSB), and the terminal equipment determines whether to perform channel detection and/or how to perform channel detection before transmitting the second signal according to at least one of the following of the synchronization signal block (SSB):

- a frequency domain position of the synchronization signal block;
- a time domain position of the synchronization signal block;

a time-frequency structure of the synchronization signal block;
a sequence of a primary synchronization signal in the synchronization signal block;
a sequence of a secondary synchronization signal in the synchronization signal block;
a sequence of a demodulation reference signal of a physical broadcast channel in the synchronization signal block;
a frequency domain position of a demodulation reference signal of a physical broadcast channel in the synchronization signal block;
a scrambling sequence of a physical broadcast channel in the synchronization signal block;
a payload of a physical broadcast channel of the synchronization signal block; or a position of the synchronization signal block relative to remaining minimum system information.

In some embodiments, the SSB is a cell-defining SSB; however, this disclosure is not limited thereto.

In some embodiments, the terminal equipment may determine whether to perform channel detection and/or how to perform channel detection before transmitting the second signal according to the frequency domain position of the SSB.

Figure 3:
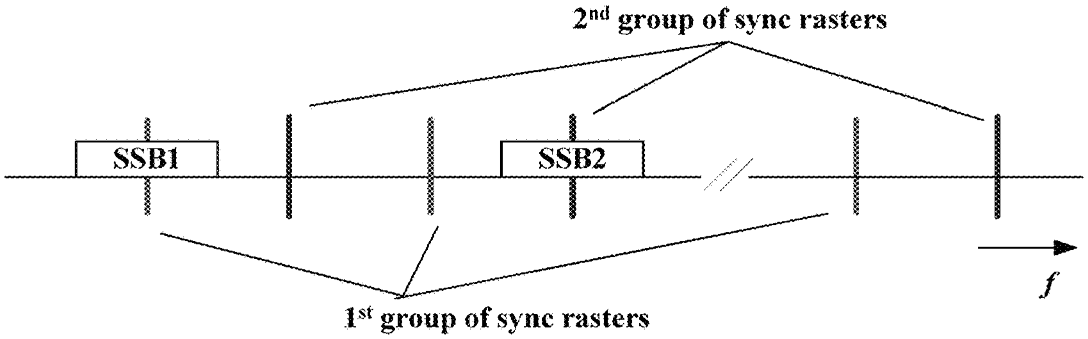
FIG. 3 is an exemplary diagram of determining whether to perform channel detection and/or how to perform channel detection before transmitting a second signal by the terminal equipment according to a frequency domain position of an SSB of the embodiment of this disclosure.

FIG. 3 is an exemplary diagram of determining whether to perform channel detection and/or how to perform channel detection before transmitting a second signal by the terminal equipment according to the frequency domain position of the SSB of the embodiment of this disclosure. For example, two groups of sync rasters may be predefined, as shown in FIG. 3.

The terminal equipment receives an SSB transmitted by a cell. If the received SSB is on the first group of sync rasters (such as SSB1), the terminal equipment does not perform channel detection before transmitting the second signal on an uplink carrier of the cell; and if the received SSB is on the second group of sync rasters (such as SSB2), the terminal equipment will perform channel detection on the uplink carrier of the cell before transmitting the second signal.

In some embodiments, how to perform channel detection by the terminal equipment before transmitting the second signal is predefined or preconfigured. For example, parameters or information of at least one of the following may be predefined or preconfigured: a length of time of channel detection; a value of a first parameter (such as a contention window CW) for generating a random number for channel detection; a value range of a first parameter for generating a random number for channel detection; a channel access type; a channel access priority; or channel access modes.

In some embodiments, the terminal equipment may also determine whether to perform channel detection and/or how to perform channel detection before transmitting the second signal according to the time domain position of the SSB. For example, if the cell defining SSB is at a first half-frame of a frame, the terminal equipment will not perform channel detection; and if it is at a second half-frame, the terminal equipment will perform channel detection. Likewise, variants may be made appropriately.

In some embodiments, the terminal equipment may also determine whether to perform channel detection and/or how to perform channel detection before transmitting the second signal according to the position of the SSB relative to the RMSI.

Figure 4:
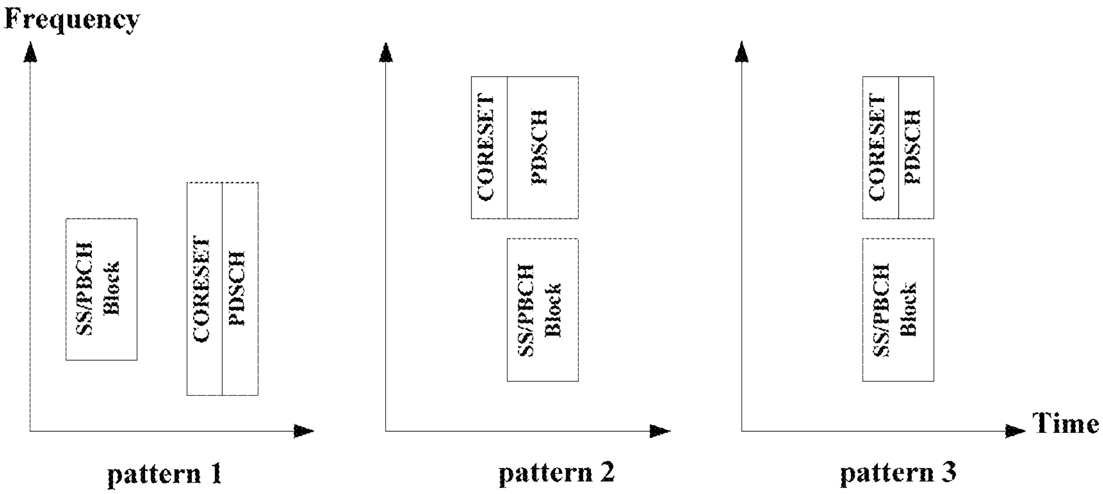
FIG. 4 is an exemplary diagram of determining whether to perform channel detection and/or how to perform channel detection before transmitting the second signal by the terminal equipment according to a position of the SSB relative to an RNSI of the embodiment of this disclosure.

FIG. 4 is an exemplary diagram of determining whether to perform channel detection and/or how to perform channel detection before transmitting the second signal by the terminal equipment according to the position of the SSB relative to the RNSI of the embodiment of this disclosure. For example, as shown in FIG. 4, if the SSB and CORESET #0 adopt pattern 1, the terminal equipment will not perform channel detection; and if pattern 2 is adopted, the terminal equipment will perform channel detection.

FIGS. 3 and 4 only exemplify how the terminal equipment determines whether to perform channel detection and/or how to perform channel detection before transmitting the second signal according to the SSB; however, the embodiment of this disclosure is not limited thereto. How to determine whether to perform channel detection and/or how to perform channel detection before transmitting the second signal according to the above information on the SSB may be flexibly selected as actually needed.

In some embodiments, the first signal is a radio resource control (RRC) message or an MAC CE or DCI. For the sake of simplicity, following description shall be given below by taking an RRC message as example, and cases of MAC CE and DCI may be processed accordingly.

In some embodiments, the first signal includes an RRC message. The RRC message may include first information, the first information being an RRC IE or a field. The terminal equipment determines whether to perform channel detection and/or how to perform channel detection before transmitting the second signal according to the first information included in the radio resource control (RRC) message. For example, the RRC message may explicitly indicate via the first information whether a UE performs channel detection and/or how to perform channel detection before transmitting the second signal.

For example, the first information is used to indicate at least one of the following of channel detection performed by the terminal equipment before transmitting the second signal: a length of time of the channel detection, a value of a random number used for channel detection (such as N in FIG. 5 described later, which may be generated by the base station based on the first parameter and then indicated to the UE via the first information), a value of the first parameter (such as a contention window (CW)) for generating a random number for channel detection; a value range of a first parameter for generating a random number for channel detection; a channel access type; a channel access priority; and channel access modes.

For another example, if the first information is used to indicate channel access modes and one of the channel access modes indicated by the first information is not to perform channel detection, the terminal equipment will not perform channel detection before transmitting the second signal when a channel access mode indicated by the first information is not to perform channel detection. And when the first information indicates other channel access modes, the terminal equipment performs channel detection before transmitting the second signal. How to perform channel detection by the terminal equipment before transmitting the second signal is predefined or preconfigured. Taking that the first information is channelAccessMode as an example, it may explicitly indicate that no channel detection is performed.

TABLE 1

```
channelAccessMode-r17      CHOICE {
    dynamic                    NULL,
    semistatic             SemiStaticChannelAccessConfig
    noChannelSensing             Null,
}
OPTIONAL, -- Need M
```

In some embodiments, the first information is per at least one of the following: a system, a cell group, a cell, a carrier, a channel group, a bandwidth part (BWP), a channel, a beam, a physical channel/physical signal, or data carried by a physical channel/physical signal. The physical channel is, for example, a PRACH/PUCCH/PUSCH, and the physical signals is, for example, an SRS.

For example, if the first information is per cell, the UE may determine whether to perform channel detection and/or how to perform channel detection according to the first information, and a result of determination is applicable to all uplink signals transmitted by the UE at the cell. More specifically, for example, if a UE learns that a cell is of "not performing channel detection", the UE will not detect a channel for all uplink signals of the cell before transmission. For another example, if the first information is per BWP, that is, if a UE learns that a UL BWP is of "not performing channel detection", the UE will not detect a channel for all uplink signals of the UL BWP before transmission.

In some embodiments, the first information may be cell-specific or UE-specific. For example, cell-specific means that for all UEs in a cell, indications of the first information are identical, and the first information may be broadcast by a base station or transmitted to a specific UE by a base station; and UE-specific means that for different UEs in a cell, indications of the first information may be different (of course, especially, they may also be identical), and the first information may be transmitted to a specific UE by a base station.

For another example, the indication of the first information is per system/cell/channel, and the first information is included in an MIB or SIB1, for example. The indication of the first information is per BWP, and the first information is included in an RRC IE for configuring a BWP, for example. If the indication of the first information is per channel, the first information is included in an RRC IE for configuring a channel, for example.

In some embodiments, the RRC IE for configuring a channel refers to an RRC IE for configuring an RB set and/or an intra cell guard bands(s).

In some embodiments, the first signal is a radio resource control (RRC) message or an MAC CE. The RRC message or MAC CE may include the first information. Taking the RRC message as an example, the first information is an RRC IE or a field. The UE determines according to whether the RRC message includes the first information whether to perform channel detection and/or how to perform channel detection before transmitting the second signal. For example, the RRC message may implicitly indicate whether the UE performs channel detection and/or how to perform channel detection before transmitting the second signal by including the first information or not.

For example, if the radio resource control (RRC) message does not include the first information, the terminal equipment does not perform channel detection before transmitting the second signal, and if the radio resource control (RRC) message includes the first information, the terminal equipment performs channel detection before transmitting the second signal.

How to perform channel detection by the terminal equipment before transmitting the second signal is predefined or preconfigured. For example, the first information is used to instruct to perform channel detection, taking that the first information is channelAccess as an example:

TABLE 2

| | |
|---|---|
| channelAccess-r17 | ENUMERATED {enabled} |

For another example, when the radio resource control (RRC) message includes the first information, the terminal equipment does not perform channel detection before transmitting the second signal, and when the radio resource control (RRC) message does not include the first information, the terminal equipment performs channel detection before transmitting the second signal. How to perform channel detection by the terminal equipment before transmitting the second signal is predefined or preconfigured. For example, the first information is used to instruct not to perform channel detection. Taking that the first information is nochannelSensing as an example:

TABLE 3

| | |
|---|---|
| noChannelSensing-r17 | ENUMERATED {enabled} |

For another example, in a case where the radio resource control (RRC) message does not include the first information, the terminal equipment does not perform channel detection before transmitting the second signal, and in a case where the radio resource control (RRC) message includes the first information, that the terminal equipment performs channel detection before transmitting the second signal and how to perform channel detection by the terminal equipment before transmitting the second signal are predefined or preconfigured.

The first information is used to instruct the terminal equipment to perform one of the following of channel detection before transmitting the second signal: a length of time of the channel detection; a value of a random number used for performing the channel detection; a value of a first parameter (e.g. CW) used for generating a random number used for performing the channel detection; a value range of a first parameter for generating a random number used for performing the channel detection; a channel access type; a channel access priority; or a channel access mode.

For example, the first information is used to indicate the channel access mode, taking that the first information is channelAccess as an example:

TABLE 4

```
channelAccessMode-r16     CHOICE {
    dynamic                   NULL,
    semistatic                SemiStaticChannelAccessConfig
  }
OPTIONAL, -- Need M
```

In some embodiments, in a case where an operating band is an unlicensed band, the radio resource control (RRC) message is able to include the first information, and in a case where an operating band is a licensed band, the radio resource control (RRC) message is unable to include the first information.

In some embodiments, the first signal may be used to indicate an operating band. In a case where the first signal indicates that an operating band is a licensed band, the terminal equipment does not perform channel detection before transmitting the second signal; or, in a case where the first signal indicates that an operating band is an unlicensed band, the terminal equipment performs channel detection before transmitting the second signal, and/or the terminal equipment determines a length of time of channel detection performed before transmitting the second signal.

For example, “not performing channel detection” may be equivalent to that “an operating band is a licensed band”, that is, the base station may also instruct the UE not to detect a channel before transmitting an uplink signal by indicating that the operating band is a licensed band, and vice versa.

Taking the RRC message as an example, not performing channel detection may be indicated by an operating band.

TABLE 5

```
    channelAccessMode-r17        CHOICE {
        dynamic                      NULL,
        semistatic                   SemiStaticChannelAccessConfig
    nonSharingSpectrum               Null,
  }
OPTIONAL, -- Need M
```

For another example, “not performing channel detection” may be nonequivalent to that “an operating band is a licensed band”, that is, when the base station instructs “not to detect a channel”, the operating band may be a licensed band, and may also be an unlicensed band.

In some embodiments, the first signal includes the SSB and the RRC message, the SSB being used by the terminal equipment to determine that the operating band is an unlicensed band, or the SSB being used by the terminal equipment to determine that the operating band is a licensed band. That is, the base station may further indicate (for example, via an SSB/RRC message(s)) that the operating band is a licensed band or an unlicensed band.

In some embodiments, the RRC message includes second information, the second information being used to indicate an operating band. That is, taking indicating via the RRC message as an example, the RRC message may include the second information, the second information being used to indicate whether the operating band is a licensed band or an unlicensed band, or the second information being used to indicate a band index of an operating band. Whether a band identified by the band index is a licensed band or an unlicensed band is predefined.

For example, following information field (i.e. the second information) may be included in the MIB:

TABLE 6

```
operationMode   ENUMERATED {sharingSpectrum, nonSharingSpectrum}
```

For another example, following information fields may be included in RRC messages other than the MIB (such as SIB1 and/or dedicated RRC messages):

TABLE 7

```
        operationMode-r17              CHOICE {
          sharingSpectrum                NULL,
          nonSharingSpectrum               Null,
      }
      OPTIONAL, -- Need M
```

In some embodiments, in a case where the first signal indicates that the channel access mode is performing no channel detection, the radio resource control (RRC) message is able to include the second information for indicating an operating band; or, in a case where the first signal does not instruct not to perform channel detection, the radio resource control (RRC) message is unable to include the second information for indicating an operating band.

For example, whether the RRC message is able to include the first information may depend on whether the operating band is a licensed band or an unlicensed band. The first information may explicitly indicate “not performing channel detection”, if the operating band is an unlicensed band, the RRC message may include the first information, and if the operating band is a licensed band, the RRC message may not include the first information.

For another example, whether the RRC message is able to include the second information depends on whether the base station instructs the UE not to detect a channel before transmitting the uplink signal. The base station may instruct “not to perform channel detection” via the SSB and/or the RRC message, and the RRC message may include the second information; otherwise the RRC message may not include the second information.

Whether to perform channel detection and how to perform channel detection are schematically described above, and the channel access mode and/or channel access type shall be further described below. For the sake of simplicity, what has been described above shall be omitted in the following description.

In some embodiments, the channel access mode includes a mode of not performing channel detection, and the channel access mode may further include a dynamic channel access mode and/or a semi-static channel access mode.

For example, for operations of an NR system at higher bands, for example, at least one of the following channel access modes may be supported: mode 1: LBE (dynamic channel access mode); mode 2: FBE (semi-static channel access mode); mode 3: not performing channel detection.

For another example, a channel access mode may correspond to one or more channel access types. A channel access type to which a channel access mode corresponds may be predefined or preconfigured, or may be configured by a base station (or referred to as being indicated by a base station). For example, being configured via RRC or being configured via an RRC message may also be referred to as being indicated by the base station via RRC signaling. The channel access type includes a type of not performing channel detection, and may further include a type of performing channel detection. For example, mode 1 may include type 1 (for initializing occupied channels), type 2 (for sharing occupied channels), and type 3 (not detecting a channel).

Figure 5:
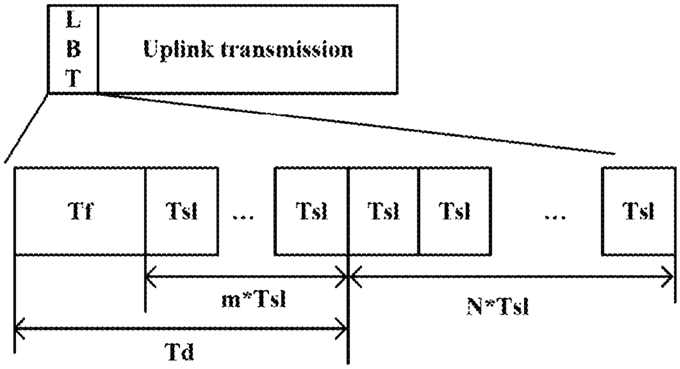
FIG. 5 is an exemplary diagram of type 1 in mode 1 of the embodiment of this disclosure.

FIG. 5 is an exemplary diagram of type 1 in mode 1 of the embodiment of this disclosure (example 1), exemplifying an example of not dividing channel access priority classes (CAPCs). For example, $T_f$=8 us, $T_{st}$=5 us, N=random(0, CW−m); where, m and CW are integers greater than or equal to 0, and CW>m, for example, m=0, CW=127.

Figure 6:
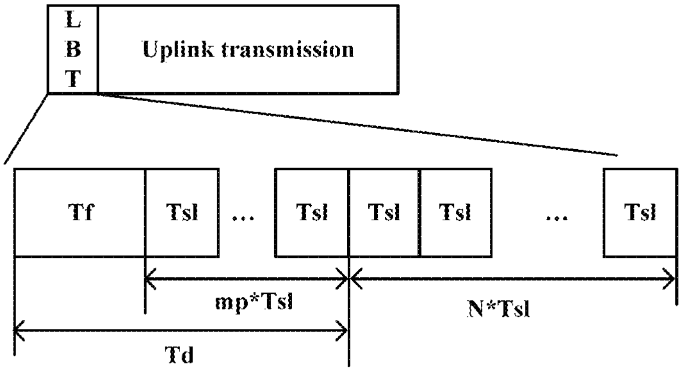
FIG. 6 is another exemplary diagram of type 1 in mode 1 of the embodiment of this disclosure.

FIG. 6 is another exemplary diagram of type 1 in mode 1 of the embodiment of this disclosure (example 2), showing an example of classifying CAPCs. For example, $T_f$=8 us, $T_{st}$=5 us N=random(0, $CW_p$); where, values of $m_p$ and $CW_p$ are shown in Table 8 below.

TABLE 8

| CAPC (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |

TABLE 8-continued

| CAPC (p) | $m_p$ | $CW_{min,p}$ | $CW_{max,p}$ | $T_{ulmcot,p}$ | allowed $CW_p$ sizes |
|---|---|---|---|---|---|
| 4 | 7 | 15 | 1023 | 6 ms or 10 ms | {15, 31, 63, 127, 255, 511, 1023} |

Figure 7:
FIG. 7 is a further exemplary diagram of type 1 in mode 1 of the embodiment of this disclosure.

FIG. 7 is a further exemplary diagram of type 1 in mode 1 of the embodiment of this disclosure (example 3), exemplifying a case of transmission where a channel is not detected and an uplink signal is transmitted.

Figure 8:
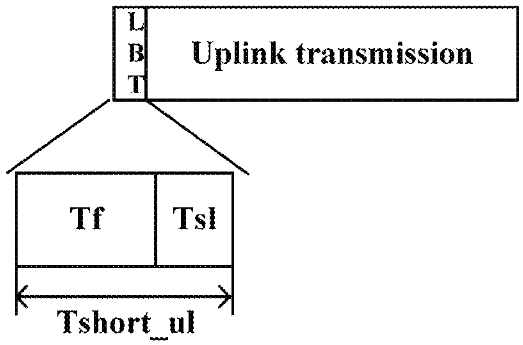
FIG. 8 is an exemplary diagram of type 2 in mode 1 of the embodiment of this disclosure.

FIG. 8 is an exemplary diagram of type 2 in mode 1 of the embodiment of this disclosure (example 1), such as within a channel occupation time to which type 1 channel access corresponds. For example, $T_f$=8 us, and $T_1$=5 us.

Figure 9:
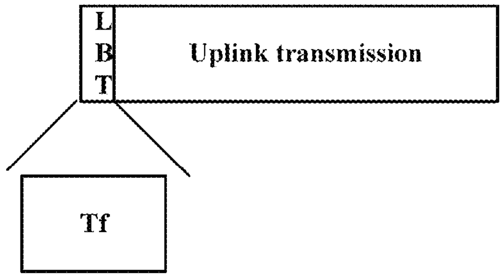
FIG. 9 is another exemplary diagram of type 2 in mode 1 of the embodiment of this disclosure.

FIG. 9 is another exemplary diagram of type 2 in mode 1 of the embodiment of this disclosure (example 2). For example, $T_f$=8 us.

Figure 10:
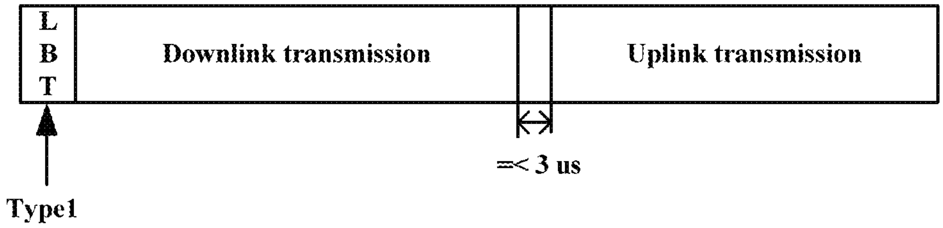
FIG. 10 is a further exemplary diagram of type 2 in mode 1 of the embodiment of this disclosure.

FIG. 10 is a further exemplary diagram of type 2 in mode 1 of the embodiment of this disclosure (example 3).

Figure 11:
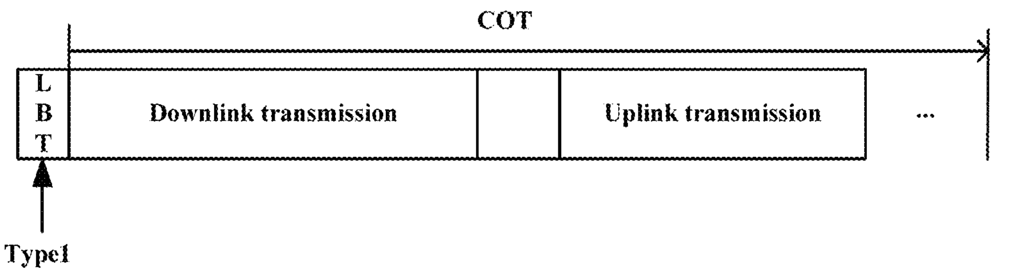
FIG. 11 is still another exemplary diagram of type 2 in mode 1 of the embodiment of this disclosure.

FIG. 11 is still another exemplary diagram of type 2 in mode 1 of the embodiment of this disclosure (example 4). No channel is detected and an uplink signal is transmitted within a channel occupation time (COT).

Mode 2 may include type 1 (for initializing occupied channels), type 2 (for sharing occupied channels), and type 3 (not detecting a channel).

Figure 12:
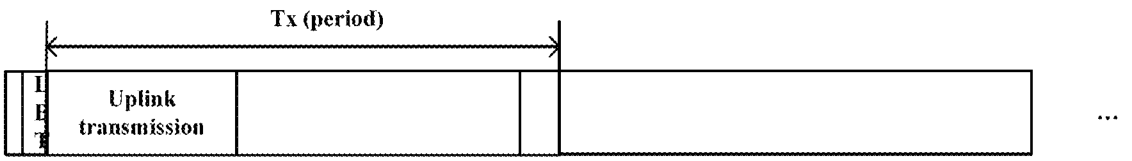
FIG. 12 is an exemplary diagram of type 1 in mode 2 of the embodiment of this disclosure.

FIG. 12 is an exemplary diagram of type 1 in mode 2 of the embodiment of this disclosure (example 1). For example, the UE transmits the uplink signal from a starting position of periodic channel occupation (CO). And a channel detection time is, for example, 5 us.

Figure 13:
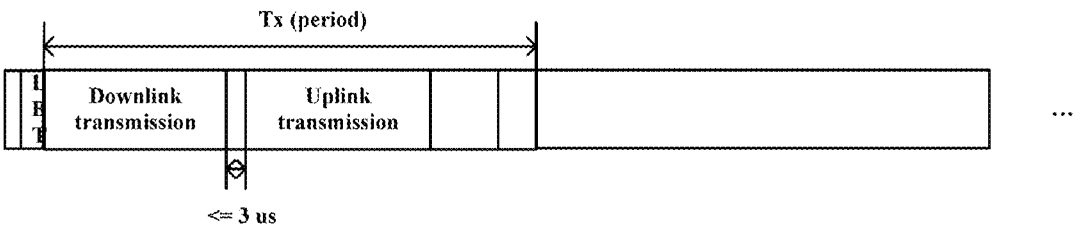
FIG. 13 is an exemplary diagram of type 2 in mode 2 of the embodiment of this disclosure.

FIG. 13 is an exemplary diagram of type 2 in mode 2 of the embodiment of this disclosure (example 1). For example, a spacing between UL and D1 transmission bursts is not in excess of 3 us, and the UE may transmit the uplink signal without detecting a channel.

Figure 14:
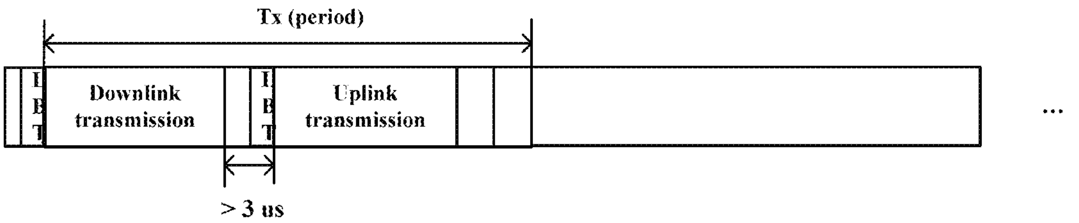
FIG. 14 is another exemplary diagram of type 2 in mode 2 of the embodiment of this disclosure.

FIG. 14 is another exemplary diagram of type 2 in mode 2 of the embodiment of this disclosure (example 2). For example, a spacing between UL and D1 transmission bursts is in excess of 3 us, and the UE may transmit the uplink signal only when it detects that a channel is idle. And a channel detection time is, for example, 5 us or 13 us.

Figure 15:
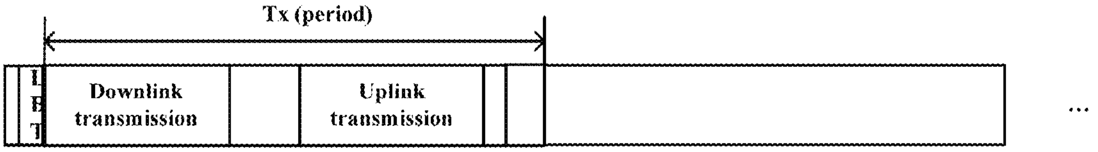
FIG. 15 is a further exemplary diagram of type 2 in mode 2 of the embodiment of this disclosure.

FIG. 15 is a further exemplary diagram of type 2 in mode 2 of the embodiment of this disclosure (example 3). For example, the uplink signal may be transmitted without detecting a channel during the channel occupation time.

The channel access mode and/or channel access type is/are exemplified; however, this disclosure is not limited thereto, and other classifications of channel access modes and/or channel access type may also be used. In addition, there may be only channel access modes or channel access types, and channel access modes and channel access types may be combined.

In the embodiment of this disclosure, the uplink resource for transmitting the second signal may be indicated by higher-layer signaling and/or DCI, or may be indicated by an RAR, and the second signal may be a PRACH, a PUCCH, a PUSCH, or an SRS. Determining whether to detect a channel and/or how to perform channel detection and transmitting the second signal by the terminal equipment shall be further described below with reference to a particular mode of indicating the uplink signal and/or the second signal.

In some embodiments, the uplink resource is configured by an RRC message, or the uplink resource (or the second signal) is scheduled by downlink control information (DCI) or a random access response (RAR), and the DCI or RAR does not include an information domain for indicating a channel access type; and in a case where the first information does not indicate not to perform channel detection, the terminal equipment transmits the second signal by using a predefined or preconfigured channel access type.

For example, the predefined or preconfigured channel access type is a type of not performing channel detection or a type of performing channel detection. The predefined or preconfigured channel access type is per at least one of the following: a system, a cell group, a cell, a carrier, a channel group, a bandwidth part (BWP), a channel, a beam, a physical channel/signal, or data carried by a physical channel/signal.

In some embodiments, the uplink resource is configured by an RRC message, or the uplink resource (or the second signal) is scheduled by downlink control information (DCI) or a random access response (RAR), and the DCI or RAR does not include an information domain for indicating a channel access type. In case where the first information does not indicate performing no channel detection, the terminal equipment performs channel detection before transmitting the second signal. How to perform channel detection by the terminal equipment before transmitting the second signal is indicated by third information.

For example, the third information is used to indicate at least one of the following: a length of time of channel detection, a value of a random number used for performing channel detection, a value of a first parameter (e.g. a CW) used for generating a random number for channel detection, a value range of a first parameter for generating a random number for channel detection; a channel access type; or a channel access priority.

More specifically, for example, the first information is used to indicate a channel access mode, one of channel access modes that the first information is able to indicate is performing no channel detection, and in a case where the first information indicates that the channel access mode is performing no channel detection, the terminal equipment does not perform channel detection before transmitting the second signal. And when the first information indicates other channel access modes, the terminal equipment performs channel detection before transmitting the second signal. How to perform channel detection by the terminal equipment before transmitting the second signal is indicated by the third information.

For example, the third information is per at least one of the following: a system, a cell group, a cell, a carrier, a channel group, a bandwidth part (BWP), a channel, a beam, a physical channel/signal, or data carried by a physical channel/signal.

In some embodiments, the uplink resource is configured by an RRC message, or the uplink resource (or the second signal) is scheduled (indicated) by downlink control information (DCI) or a random access response (RAR), and the DCI or RAR does not include an information domain used to indicate a channel access type. The first information is used to indicate a channel access type, and the terminal equipment transmits the second signal by using the channel access type indicated by the first information.

In some embodiments, the uplink resource (or the second signal) is scheduled by DCI or an RAR. When the first signal indicates performing no channel detection, the terminal equipment determines that the DCI or RAR used to schedule the uplink resource does not include the information domain used to indicate a channel access type, and the terminal equipment does not perform channel detection before transmitting the second signal.

In some embodiments, the uplink resource (or the second signal) is scheduled by DCI or an RAR. When the first signal does not indicate performing no channel detection, the terminal equipment further determines the information domain for indicating the channel access type included in the DCI or RAR for scheduling the uplink resource according to fourth information, the fourth information being at least used to indicate channel access types that the DCI or RAR is able to indicate.

In some embodiments, the terminal equipment transmits the second signal by using the channel access type indicated by the DCI or RAR, or transmits the second signal by using the channel access type indicated by the fourth information when the fourth information indicates one channel access type.

In some embodiments, the second signal is a physical uplink shared channel (PUSCH), and following description shall be given by taking a PUSCH as an example.

For example, for the PUSCH configured by RRC (such as Type 1/Type 2CG), the first information and/or the third information is/are included in configuration information for a configured grant (CG). For example, the UE transmits the PUSCH by using the channel access type indicated by the third information included in the RRC message. For example, if the channel access type indicated by the third information is performing no channel detection, the UE may transmit the configured PUSCH without detecting a channel.

For another example, for a PUSCH dynamically scheduled by DCI (such as DCI 0_0, 0_1), the UE transmits the PUSCH by using the channel access type indicated by the third information in the DCI.

In some embodiments, the UE may determine a size and/or content of the DCI according to the channel access mode and/or fourth information before receiving the DCI. The fourth information is at least used to indicate channel access types that the DCI is able to indicate. The fourth information is, for example, included in the RRC message. And the indication may be per DCI format.

Taking DCI 0_0 as an example, for example, if the channel access mode is mode 3, the third information is not included in DCI 0_0. For another example, if the channel access mode is mode 1, the fourth message indicates that a channel access type that DCI 0_0 is able to indicate is one or more in above mode 1. In particular, when the number of the indication is 1, DCI 0_0 may not include the third information, and after receiving DCI 0_0 for scheduling the PUSCH, the UE may transmit the PUSCH scheduled by the DCI by using the channel access type indicated by the fourth message.

In some embodiments, when the base station does not indicate a channel access type of a PUSCH, the UE may determine a channel access type according to a traffic type/priority. Channel access types that the traffic type/priority is/are able to adopt may be predefined or may be indicated by the base station. For example, without detecting a channel, the UE may transmit PUSCHs for carrying, for example, the following information: SRB0, SRB1, and SRB3, MAC CEs (except the padding BSR and recommended bit rate MAC CEs).

In some embodiments, the second signal is a PUCCH, and following description shall be given by taking a PUCCH as an example. And the first information or the third information is included in configuration information of the PUCCH, or configuration information of an SR, or configuration information of CSI.

For example, for the PUCCH configured by the RRC (such as a PUCCH reported by CSI used for an SR or P/SP), the UE transmits the PUCCH by using the channel access type indicated by the third information included in the RRC message. More specifically, the third information may be included in the configuration information reported by the CSI of the SR or P/SP. For example, if the channel access type indicated by the third information is performing no channel detection, the UE may transmit the configured PUCCH without detecting a channel. And on the other hand, the third information may also be per UCI type.

For another example, for a PUCCH dynamically scheduled by the DCI (such as DCI 1_0, 1_1), the UE transmits the PUCCH by using the channel access type indicated by the third information in SIB1.

For example, before receiving the DCI, the UE may determine the size and/or content of the DCI according to the channel access mode and/or the fourth information. The fourth information is at least used to indicate channel access types that the DCI is able to indicate. The fourth information is included in the RRC message, for example. And the indication may be per DCI format.

Specifically, taking DCI 1_0 as an example, for example, if the channel access mode is mode 3, DCI 1_0 does not include the third information. For another example, if the channel access mode is mode 1, the channel access types that the fourth message DCI 1_0 is able to indicate may indicate are, for example, one or more in above mode 1. In particular, when the number of the indication is 1, DCI 1_0 may not include the third information, and after receiving DCI 1_0 for scheduling the PUCCH, the UE may transmit the PUCCH scheduled by the DCI by using the channel access type indicated by the fourth message.

For another example, in a case where the base station does not indicate a channel access type of a PUCCH, the UE may determine a channel access type according to a UCI type. Channel access types that the UCI type is able to adopt may be predefined, or may be indicated by the base station. For example, without detecting a channel, the UE may transmit a PUSCH for carrying, for example, the following information: HARQ-ACK, an SR.

In some embodiments, the second signal is a sounding reference signal (SRS), and following description shall be given by taking an SRS as an example. The first information or the third information is included in configuration information of the sounding reference signal (SRS).

For example, for an SRS (P/SP SRS) configured by RRC, the UE may transmit the SRS according to the channel access type indicated by the third information included in the RRC message. More specifically, the third information may be included in configuration information of the SRS.

For another example, for a dynamically scheduled SRS, if the SRS is not transmitted together with the PUSCH, UE transmits the SRS by using a preconfigured channel access type. For example, the preconfigured channel access type is indicated by the third information included in the RRC message, and the third information may be included in configuration information of the SRS.

In some embodiments, the second signal is a physical random access channel (PRACH), and following description shall be given by taking a PRACH as an example. The first information or the third information is included in configuration information of the physical random access channel (PRACH).

For example, for RA triggered by a higher layer (MAC/RRC/PDCCH order), the UE may transmit the PRACH according to a channel access type indicated by the third information included in the RRC message. More specifically, the third information may be included in configuration information of the PRACH. For example, if the channel access type indicated by the third information is performing no channel detection, the UE may transmit the PRACH without detecting a channel. And on the other hand, the third information may also be per RA type (e.g. CBRA/CFRA)/usage (UL sync./BFR).

For another example, for PDCCH order triggered RA, DCI for triggering the RA may include the third information, and the UE transmits the PRACH by using the channel access type indicated by the third information in the DCI.

The embodiment of this disclosure has been illustrated respectively above by taking the PUSCH, PUCCH, SRS and PRACH as examples; however, this disclosure is not limited thereto.

In some embodiments, for a case where “type X2” based on common DCI (common SCI) is allowed, the UE may be switched from type X1 to type X2. Type X1 is, for example, examples 1/2 of above mode 1, and Type X2 is, for example, examples 1/2/3/4 of above mode 1. Type X1/X2 are predefined, or are configured by RRC. And on the other hand, an RRC message may be predefined or used to configure a signal/channel/traffic type for performing the above switching in the above cases.

In some embodiments, the terminal equipment transmits a measurement result to the network device, the measurement result being per at least one of the following: a cell, a cell group, a channel, a channel group, a bandwidth part (BWP), or a beam.

For example, the measurement result includes at least one of the following: a received signal strength, channel occupation (CO) information, information that channel detection needs to be performed, or information that channel detection needs not to be performed.

For another example, the terminal equipment transmits the measurement result when certain conditions are satisfied, the conditions including: a received signal strength and/or that channel occupation is greater than a first threshold, and/or the received signal strength and/or that channel occupation is less than a second threshold.

In some embodiments, the UE transmits (or reports) fifth information to a first cell after receiving a first signal (such as an SSB and/or SIB1) transmitted by a second cell. The fifth information includes, for example, at least one of the following:

- a channel access mode of the second cell;
- whether the second cell performs channel detection;
- first information carried by the first signal transmitted by the second cell;
- channel configuration of the second cell (such as an RB set and/or intra-cell guard band configuration of the second cell);
- MIB of the second cell; or
- SIB1 of the second cell;
- wherein the first cell and the second cell belong to the same communication system or different communication systems, and the first cell is an active serving cell of the UE.

Figure 16:
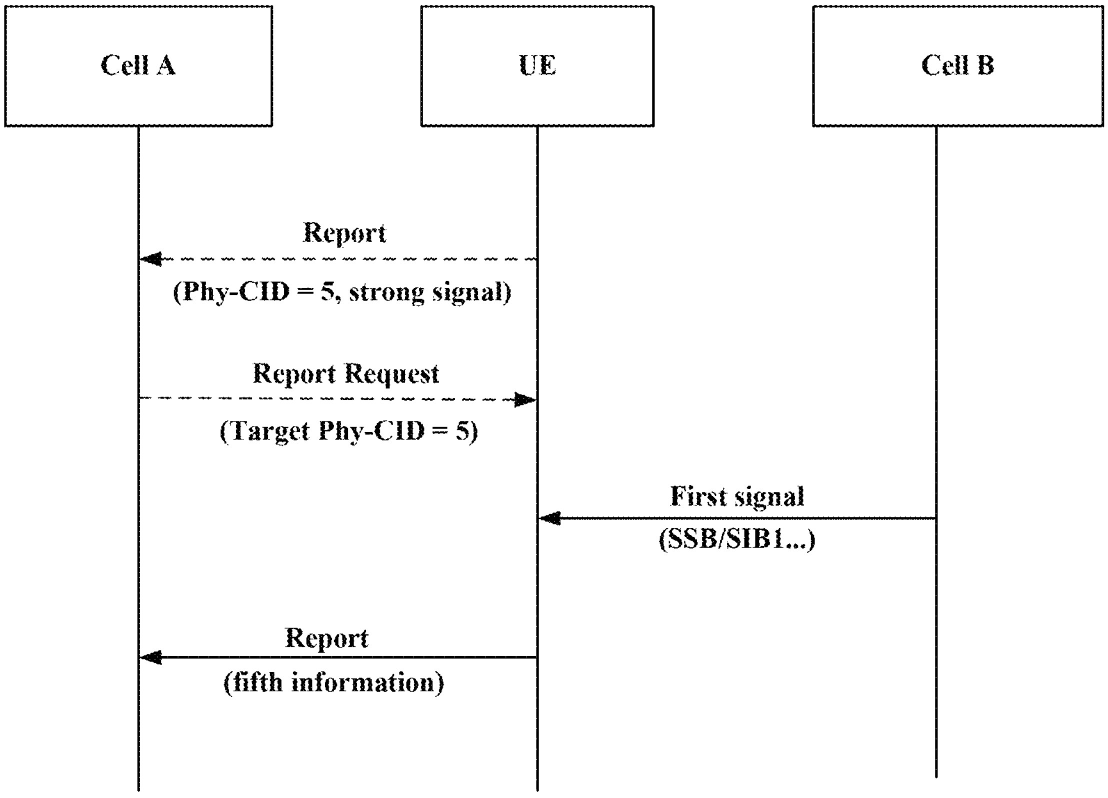
FIG. 16 is an exemplary diagram of transmitting an uplink signal by the terminal equipment of the embodiment of this disclosure.

FIG. 16 is an exemplary diagram of transmitting the uplink signal by the terminal equipment of the embodiment of this disclosure. As shown in FIG. 16, the UE receives the first signal (e.g. SSB/SIB1 . . . ) transmitted by the second cell (cell B, for example, Phy-CID=5, Global-CID=19), and may report fifth information to the first cell (cell A, for example, Phy-CID=3, Global-CID=17). As shown in FIG. 16, the UE and the first cell (cell A) may also exchange information.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiments that the terminal equipment receives the first signal transmitted by the network device, the first signal being at least used by the terminal equipment to determine whether to perform channel detection and/or how to perform channel detection before transmitting the second signal; and the terminal equipment transmits the second signal to the network device by using the uplink resource. Hence, NR may be supported to perform uplink transmission at higher frequencies, and the network device may flexibly control the terminal equipment to perform or not to perform channel detection and/or how to perform channel detection by the terminal equipment, which is applicable to various scenarios, and may avoid unnecessary channel detection as much as possible, thereby saving power of the terminal equipment and improving resource utilization and throughput.

Embodiments of a Second Aspect

The embodiments of this disclosure provide a method for receiving an uplink signal, which shall be described from a network device side, with contents identical to those in the embodiments of the first aspect being not going to be described any further.

Figure 17:
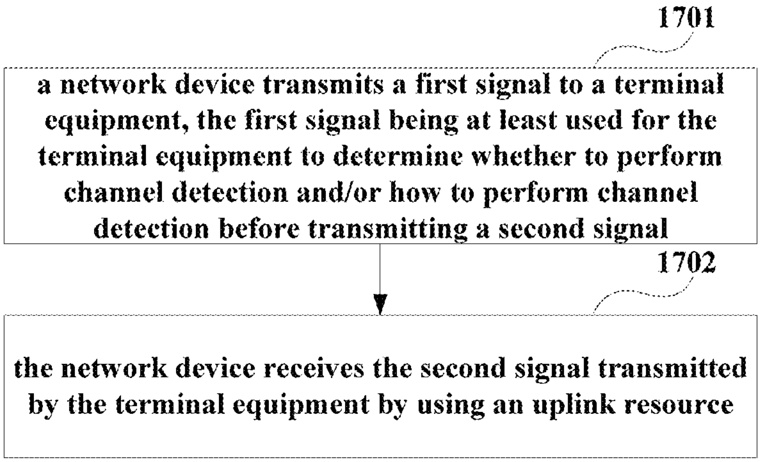
FIG. 17 is a schematic diagram of the method for receiving an uplink signal of an embodiment of this disclosure.

FIG. 17 is a schematic diagram of the method for receiving an uplink signal of the embodiment of this disclosure. As shown in FIG. 17, the method includes:

1701: a network device transmits a first signal to a terminal equipment, the first signal being at least used for the terminal equipment to determine whether to perform channel detection and/or how to perform channel detection before transmitting a second signal; and

1702: the network device receives the second signal transmitted by the terminal equipment by using an uplink resource.

It should be noted that FIG. 17 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 17.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiments that the terminal equipment receives the first signal transmitted by the network device, the first signal being at least used by the terminal equipment to determine whether to perform channel detection and/or how to perform channel detection before transmitting the second signal; and the terminal equipment transmits the second signal to the network device by using the uplink resource. Hence, NR may be supported to perform uplink transmission at higher frequencies, and the network device may flexibly control the terminal equipment to perform or not to perform channel detection and/or how to perform channel detection by the terminal equipment, which is applicable to various scenarios, and may avoid unnecessary channel detection as much as possible, thereby saving power of the terminal equipment and improving resource utilization and throughput.

Embodiments of a Third Aspect

The embodiments of this disclosure provide an apparatus for transmitting an uplink signal. The apparatus may be, for example, a terminal equipment, or may be one or more components or assemblies configured in a terminal equipment, with contents identical to those in the embodiments of the first aspect being not going to be described herein any further.

Figure 18:
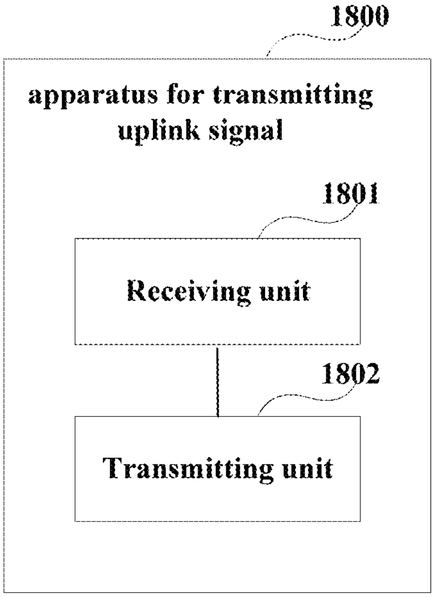
FIG. 18 is a schematic diagram of the apparatus for transmitting an uplink signal of an embodiment of this disclosure.

FIG. 18 is a schematic diagram of the apparatus for transmitting an uplink signal of the embodiment of this disclosure. As shown in FIG. 18, an apparatus 1800 for transmitting an uplink signal includes:

- a receiving unit 1801 configured to receive a first signal transmitted by a network device, the first signal being at least used for the terminal equipment to determine whether to perform channel detection and/or how to perform channel detection before transmitting a second signal; and
- a transmitting unit 1802 configured to transmit the second signal to the network device by using an uplink resource.

In some embodiments, the first signal includes at least one of the following: a synchronization signal block, a radio resource control message, a media access control element, and downlink control information.

In some embodiments, the uplink resource is at a licensed band, or the uplink resource is at an unlicensed band.

In some embodiments, the first signal is used to indicate a channel access mode and/or a channel access type and/or an operating band.

In some embodiments, the first signal is a synchronization signal block, and the terminal equipment determines whether to perform channel detection and/or how to perform channel detection before transmitting the second signal according to at least one of the following of the synchronization signal block:

- a frequency domain position of the synchronization signal block;
- a time domain position of the synchronization signal block;
- a time-frequency structure of the synchronization signal block;
- a sequence of a primary synchronization signal in the synchronization signal block;
- a sequence of a secondary synchronization signal in the synchronization signal block;
- a sequence of a demodulation reference signal of a physical broadcast channel in the synchronization signal block;
- a frequency domain position of a demodulation reference signal of a physical broadcast channel in the synchronization signal block;
- a scrambling sequence of a physical broadcast channel in the synchronization signal block;
- a payload of a physical broadcast channel of the synchronization signal block; or
- a position of the synchronization signal block relative to remaining minimum system information.

In some embodiments, the first signal includes a radio resource control message or an MAC CE or DCI, and according to first information included in the radio resource control message, the terminal equipment determines not to perform channel detection before transmitting the second signal.

In some embodiments, according to the first information included in the radio resource control message, the terminal equipment determines to perform channel detection before transmitting the second signal, and/or determines a length of time of performing channel detection before transmitting the second signal.

In some embodiments, the first signal includes a radio resource control message, and in a case where the radio resource control message does not include the first information, the terminal equipment does not perform channel detection before transmitting the second signal, or in a case where the radio resource control message includes the first information, the terminal equipment does not perform channel detection before transmitting the second signal.

In some embodiments, the first information is cell-specific or UE-specific, and the first information is per at least one of the following: a system, a cell group, a cell, a carrier, a channel group, a bandwidth part, a channel, a beam, a physical channel/physical signal, or data carried by a physical channel/physical signal.

In some embodiments, the first information is used to indicate a channel access mode and/or a channel access type.

In some embodiments, in a case where the operating band is an unlicensed band, the radio resource control message is able to include the first information, and in a case where the operating band is a licensed band, the radio resource control message is unable to include the first information.

In some embodiments, the first signal includes an SSB and an RRC message, the SSB being used by the terminal equipment to determine that the operating band is an unlicensed band, or the SSB being used by the terminal equipment to determine that the operating band is a licensed band.

In some embodiments, the RRC message includes second information. The second information is used to indicate an operating band, or the first signal is further used to indicate an operating band.

In some embodiments, when the first signal indicates that the operating band is a licensed band, the terminal equipment does not perform channel detection before transmitting the second signal.

In some embodiments, when the first signal indicates that the operating band is an unlicensed band, the terminal equipment performs channel detection before transmitting the second signal, and/or determines a length of time of performing channel detection before transmitting the second signal.

In some embodiments, the channel access mode includes a mode of not performing channel detection, and/or, the channel access mode further includes a dynamic channel access mode and/or a semi-static channel access mode.

In some embodiments, the first signal is used for indicating a channel access mode; and when the first signal indicates that the channel access mode is performing no channel detection, the radio resource control message is able to include second information for indicating an operating band, or when the first signal indicates that the channel access mode is performing no channel detection, the radio resource control message is unable to include second information for indicating an operating band.

In some embodiments, the channel access type includes a type of not performing channel detection, and may further include a type of performing channel detection.

In some embodiments, the uplink resource is configured by an RRC message, or the uplink resource is scheduled by downlink control information or a random access response, and the DCI or RAR does not include an information domain used to indicate a channel access type.

In some embodiments, when the first information does not indicate not performing channel detection, the terminal equipment transmits the second signal by using a predefined or preconfigured channel access type, wherein the predefined or preconfigured channel access type is the type of not performing channel detection, or the predefined or preconfigured channel access type is the type of performing channel detection.

In some embodiments, the predefined or preconfigured channel access type is per at least one of the following: a system, a cell group, a cell, a carrier, a channel group, a bandwidth part, a channel, a beam, a physical channel/signal, or data carried by a physical channel/signal.

In some embodiments, the uplink resource is configured by an RRC message. In case where the first information does not indicate performing no channel detection, the terminal equipment transmits the second signal by using a channel access type indicated by third information.

In some embodiments, the third information is per at least one of the following: a system, a cell group, a cell, a carrier, a channel group, a bandwidth part, a channel, a beam, a physical channel/signal, or data carried by a physical channel/signal.

In some embodiments, the uplink resource is configured by an RRC message, or the uplink resource is scheduled by downlink control information or a random access response, and the DCI or RAR does not include an information domain used to indicate a channel access type.

In some embodiments, the first information is used to indicate a channel access type, and the terminal equipment transmits the second signal by using the channel access type indicated by the first information.

In some embodiments, the second signal is a physical uplink shared channel, and the first information or the third information is included in configuration information of a configured grant.

In some embodiments, the second signal is a sounding reference signal, and the first information or the third information is included in configuration information of the sounding reference signal.

In some embodiments, the second signal is a physical random access channel, and the first information or the third information is included in configuration information of the physical random access channel.

In some embodiments, the second signal is a physical uplink control channel, and the first information or the third information is included in configuration information of the PUCCH or configuration information of a scheduling request or configuration information of channel state information.

In some embodiments, the uplink resource is scheduled by DCI or an RAR, and when the first signal indicates performing no channel detection, the terminal equipment determines that the downlink control information or random access response scheduling the uplink resource does not include an information domain indicating a channel access type, and the terminal equipment does not perform channel detection before transmitting the second signal.

In some embodiments, the uplink resource is scheduled by DCI or an RAR, and when the first signal does not indicate performing no channel detection, according to fourth information, the terminal equipment determines an information domain indicating a channel access type and included in the downlink control information or random access response scheduling the uplink resource, the fourth information being at least used to indicate a channel access type that the downlink control information or random access response is able to indicate.

In some embodiments, the terminal equipment transmits the second signal by using the channel access type indicated by the DCI or RAR, or, when the fourth information indicates one channel access type, the terminal equipment transmits the second signal by using the channel access type indicated by the fourth information.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the apparatus 1700 for transmitting an uplink signal may further include other components or modules, and reference may be made to related techniques for particulars of these components or modules.

Furthermore, for the sake of simplicity, connection relationships between the components or modules or signal profiles thereof are only illustrated in FIG. 17. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiment that the terminal equipment receives the first signal transmitted by the network device, the first signal being at least used by the terminal equipment to determine whether to perform channel detection and/or how to perform channel detection before transmitting the second signal; and the terminal equipment transmits the second signal to the network device by using the uplink resource. Hence, NR may be supported to perform uplink transmission at higher frequencies, and the network device may flexibly control the terminal equipment to perform or not to perform channel detection and/or how to perform channel detection by the terminal equipment, which is applicable to various scenarios, and may avoid unnecessary channel detection as much as possible, thereby saving power of the terminal equipment and improving resource utilization and throughput.

Embodiments of a Fourth Aspect

The embodiments of this disclosure provide an apparatus for receiving an uplink signal. The apparatus may be, for example, a network device, or may be one or more components or assemblies configured in a network device, with contents identical to those in the embodiments of the first and second aspects being not going to be described herein any further.

Figure 19:
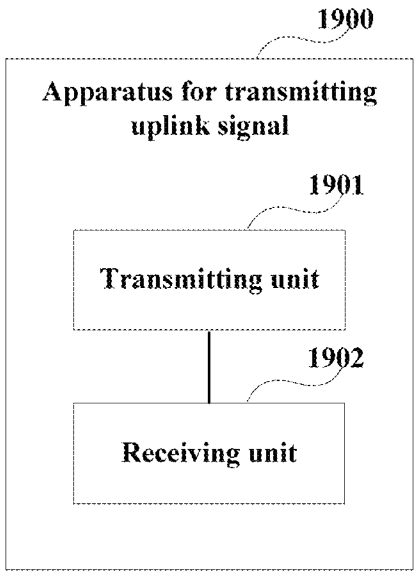
FIG. 19 is a schematic diagram of the apparatus for receiving an uplink signal of an embodiment of this disclosure.

FIG. 19 is a schematic diagram of the apparatus for receiving an uplink signal of the embodiment of this disclosure. As shown in FIG. 19, an apparatus 1900 for receiving an uplink signal includes:

a transmitting unit 1901 configured to transmit a first signal to a terminal equipment, the first signal being at least used for the terminal equipment to determine whether to perform channel detection and/or how to perform channel detection before transmitting a second signal; and a receiving unit 1902 configured to receive the second signal transmitted by the terminal equipment by using an uplink resource.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the apparatus 1900 for receiving an uplink signal may further include other components or modules, and reference may be made to related techniques for particulars of these components or modules.

Furthermore, for the sake of simplicity, connection relationships between the components or modules or signal profiles thereof are only illustrated in FIG. 19. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the terminal equipment receives the first signal transmitted by the network device, the first signal being at least used by the terminal equipment to determine whether to perform channel detection and/or how to perform channel detection before transmitting the second signal; and the terminal equipment transmits the second signal to the network device by using the uplink resource. Hence, NR may be supported to perform uplink transmission at higher frequencies, and the network device may flexibly control the terminal equipment to perform or not to perform channel detection and/or how to perform channel detection by the terminal equipment, which is applicable to various scenarios, and may avoid unnecessary channel detection as much as possible, thereby saving power of the terminal equipment and improving resource utilization and throughput.

Embodiments of a Fifth Aspect

The embodiments of this disclosure provide a communication system, and reference may be made to FIG. 1, with contents identical to those in the embodiments of the first to the fourth aspects being not going to be described herein any further. The communication system may include:

a terminal equipment configured to receive a first signal, the first signal being at least used for the terminal equipment to determine whether to perform channel detection and/or how to perform channel detection before transmitting a second signal, and transmit the second signal by using an uplink resource; and a network device configured to transmit the first signal and receive the second signal.

The embodiment of this disclosure further provides a network device, which may be, for example, a base station. However, this disclosure is not limited thereto, and it may also be another network device.

Figure 20:
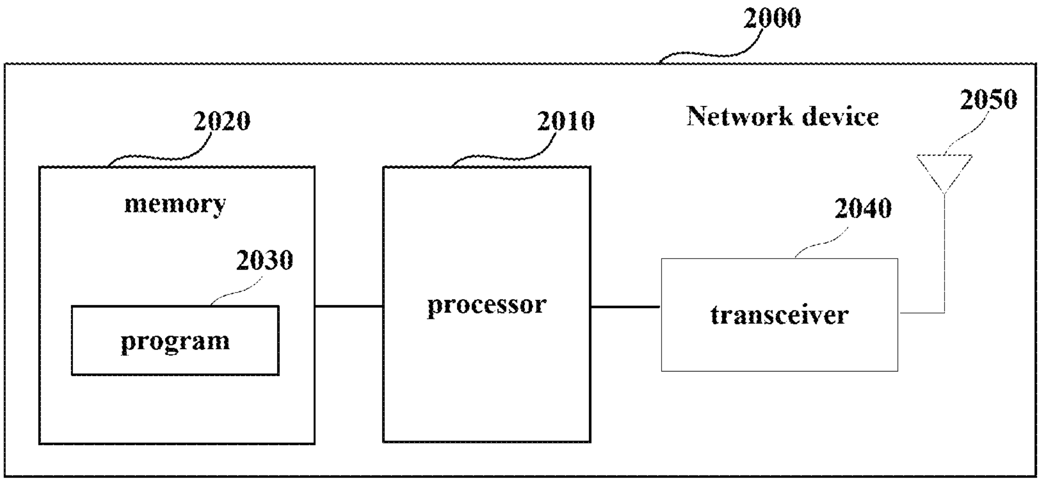
FIG. 20 is a schematic diagram of the network device of an embodiment of this disclosure.

FIG. 20 is a schematic diagram of a structure of the network device of the embodiment of this disclosure. As shown in FIG. 20, a network device 2000 may include a processor 2010 (such as a central processing unit (CPU)) and a memory 2020, the memory 2020 being coupled to the processor 2010. The memory 2020 may store various data, and furthermore, it may store a program 2030 for data processing, and execute the program 2030 under control of the processor 2010.

For example, the processor 2010 may be configured to execute a program to carry out the method for receiving an uplink signal as described in the embodiment of the second aspect. For example, the processor 2010 may be configured to execute the following control: transmitting a first signal to a terminal equipment, the first signal being at least used for the terminal equipment to determine whether to perform channel detection and/or how to perform channel detection before transmitting a second signal; and receiving the second signal transmitted by the terminal equipment by using an uplink resource.

Furthermore, as shown in FIG. 20, the network device 2000 may include a transceiver 2040, and an antenna 2050, etc. Functions of the above components are similar to those in the related art, and shall not be described herein any further. It should be noted that the network device 2000 does not necessarily include all the parts shown in FIG. 20, and furthermore, the network device 2000 may include parts not shown in FIG. 20, and the related art may be referred to.

The embodiment of this disclosure further provides a terminal equipment; however, this disclosure is not limited thereto, and it may also be another equipment.

Figure 21:
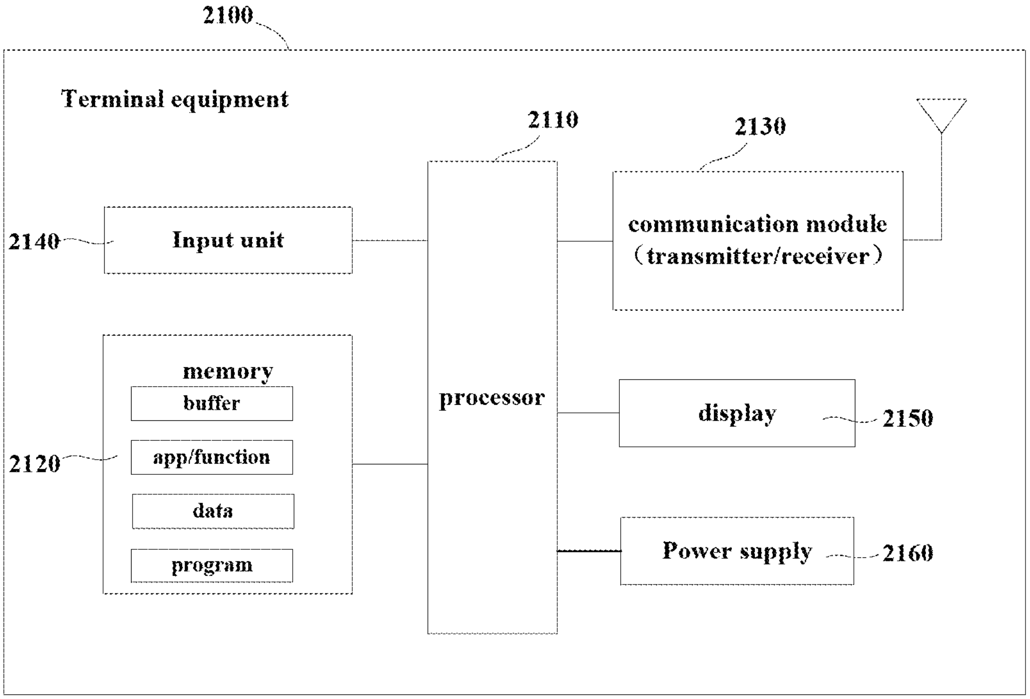
FIG. 21 is a schematic diagram of the terminal equipment of an embodiment of this disclosure.

FIG. 21 is a schematic diagram of the terminal equipment of the embodiment of this disclosure. As shown in FIG. 21, a terminal equipment 2100 may include a processor 2110 and a memory 2120, the memory 2120 storing data and a program and being coupled to the processor 2110. It should be noted that this figure is illustrative only, and other types of structures may also be used, so as to supplement or replace this structure and achieve a telecommunications function or other functions.

For example, the processor 2110 may be configured to execute a program to carry out the method for transmitting an uplink signal as described in the embodiment of the first aspect. For example, the processor 2110 may be configured to perform the following control: receiving a first signal transmitted by a network device, the first signal being at least used for the terminal equipment to determine whether to perform channel detection and/or how to perform channel detection before transmitting a second signal; and transmitting the second signal to the network device by using an uplink resource.

As shown in FIG. 21, the terminal equipment 2100 may further include a communication module 2130, an input unit 2140, a display 2150, and a power supply 2160, wherein functions of the above components are similar to those in the related art, which shall not be described herein any further. It should be noted that the terminal equipment 2100 does not necessarily include all the parts shown in FIG. 21, and the above components are not necessary. Furthermore, the terminal equipment 2100 may include parts not shown in FIG. 21, and the related art may be referred to.

An embodiment of this disclosure provides a computer readable program, which, when executed in a terminal equipment, will cause the terminal equipment to carry out the method for transmitting an uplink signal as described in the embodiment of the first aspect.

An embodiment of this disclosure provides a computer storage medium, including a computer readable program, which will cause a terminal equipment to carry out the method for transmitting an uplink signal as described in the embodiment of the first aspect.

An embodiment of this disclosure provides a computer readable program, which, when executed in a network device, will cause the network device to carry out the method for receiving an uplink signal as described in the embodiment of the second aspect.

An embodiment of this disclosure provides a computer storage medium, including a computer readable program, which will cause a network device to carry out the method for receiving an uplink signal as described in the embodiment of the second aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the embodiments herein. Various variants and modifications may be made by those skilled in the art according to the principle herein, and such variants and modifications fall within the scope.

As to implementations containing the above embodiments, following supplements are further disclosed.

Supplement 1. A method for transmitting an uplink signal, including:

receiving by a terminal equipment a first signal transmitted by a network device, the first signal being at least used for the terminal equipment to determine whether to perform channel detection and/or how to perform channel detection before transmitting a second signal; and transmitting the second signal by the terminal equipment to the network device by using an uplink resource.

Supplement 2. The method according to supplement 1, wherein the first signal includes at least one of the following: a synchronization signal block (SSB), a radio resource control (RRC) message, a media access control (MAC) control element (CE), downlink control information (DCI), or a random access response (RAR).

Supplement 3. The method according to supplement 1, wherein the uplink resource is at a licensed band, or the uplink resource is at an unlicensed band.

Supplement 4. The method according to any one of supplements 1-3, wherein that the terminal equipment determines whether to perform channel detection before transmitting a second signal includes: determining by the terminal equipment not to perform channel detection before transmitting the second signal, or, determining by the terminal equipment to perform channel detection before transmitting the second signal.

Supplement 5. The method according to any one of supplements 1-3, wherein that the terminal equipment determines how to perform channel detection before transmitting a second signal includes: determining by the terminal equipment a length of time of channel detection performed before transmitting the second signal; and/or, determining by the terminal equipment a type of channel access of channel detection performed before transmitting the second signal; and/or, determining by the terminal equipment a priority of channel access of channel detection performed before transmitting the second signal.

Supplement 6. The method according to any one of supplements 1-5, wherein the first signal is used to indicate at least one of the following of channel detection performed by the terminal equipment before transmitting the second signal: a length of time of the channel detection, a value of a random number used for channel detection, a value of the first parameter for generating a random number for channel detection; a value range of a first parameter for generating a random number for channel detection; a channel access type; a channel access priority; or channel access modes.

Supplement 7. The method according to any one of supplements 1-5, wherein the first signal is used to indicate a channel access mode and/or a channel access type and/or an operating band.

Supplement 8. The method according to any one of supplements 1-7, wherein the first signal is a synchronization signal block (SSB), and the terminal equipment determines whether to perform channel detection and/or how to perform channel detection before transmitting a second signal according to at least one of following of the synchronization signal block (SSB):

a frequency domain position of the synchronization signal block (SSB);

a time domain position of the synchronization signal block (SSB);

a time-frequency structure of the synchronization signal block (SSB);

a sequence of a primary synchronization signal in the synchronization signal block (SSB);

a sequence of a secondary synchronization signal in the synchronization signal block (SSB);

a sequence of a demodulation reference signal (DMRS) of a physical broadcast channel (PBCH) in the synchronization signal block (SSB);

a frequency domain position of a demodulation reference signal (DMRS) of a physical broadcast channel (PBCH) in the synchronization signal block (SSB);

a scrambling sequence of a physical broadcast channel (PBCH) in the synchronization signal block (SSB);

a payload of a physical broadcast channel (PBCH) of the synchronization signal block (SSB); or a position of the synchronization signal block (SSB) relative to remaining minimum system information (RMSI).

Supplement 9. The method according to any one of supplements 1-7, wherein the first signal includes a radio resource control (RRC) message or an MAC CE or DCI, and according to first information included in the radio resource control (RRC) message, the terminal equipment determines not to perform channel detection before transmitting the second signal; or according to first information included in the radio resource control (RRC) message, the terminal equipment determines to perform channel detection before transmitting the second signal, and/or determines the length of time of the channel detection performed before transmitting the second signal.

Supplement 10. The method according to any one of supplements 1-7, wherein the first signal includes a radio resource control (RRC) message, and in a case where the radio resource control (RRC) message does not include first information, the terminal equipment does not perform channel detection before transmitting the second signal, or, in a case where the radio resource control (RRC) message includes first information, the terminal equipment does not perform channel detection before transmitting the second signal.

Supplement 11. The method according to supplement 9 or 10, wherein the first information is cell-specific or UE-specific.

Supplement 12. The method according to any one of supplements 9-11, wherein the first information is per at least one of the following: a system, a cell group, a cell, a carrier, a channel group, a bandwidth part (BWP), a channel, a beam, a physical channel/signal, or data carried by a physical channel/signal.

Supplement 13. The method according to any one of supplements 9-12, wherein when an operating band is an unlicensed band, the radio resource control (RRC) message is able to include the first information; and when an operating band is a licensed band, the radio resource control (RRC) message is unable to include the first information.

Supplement 14. The method according to any one of supplements 9-13, wherein the first information is used to indicate a channel access mode and/or a channel access type.

Supplement 15. The method according to supplement 13 or 14, wherein the first signal includes an SSB and the RRC message, the SSB being used for the terminal equipment to determine that the operating band is an unlicensed band, or the SSB being used for the terminal equipment to determine that the operating band is a licensed band.

Supplement 16. The method according to supplement 13 or 14, wherein the RRC message includes second information, the second information being used to indicate an operating band.

Supplement 17. The method according to supplement 7, wherein in a case where the first signal indicates that the operating band is a licensed band, the terminal equipment does not perform channel detection before transmitting the second signal; or, in a case where the first signal indicates that the operating band is an unlicensed band, the terminal equipment performs channel detection before transmitting the second signal, and/or determines the length of time of performing channel detection before transmitting the second signal.

Supplement 18. The method according to supplement 7 or 14, wherein the channel access mode includes a mode of performing no channel detection.

Supplement 19. The method according to supplement 18, wherein the first signal is used to indicate the channel access mode, and in a case where the first signal indicates that the channel access mode is performing no channel detection, the radio resource control (RRC) message is able to include the second information for indicating an operating band; or, in a case where the first signal indicates that the channel access mode is not performing no channel detection, the radio resource control (RRC) message is unable to include the second information for indicating an operating band.

Supplement 20. The method according to supplement 18, wherein the channel access mode further includes a dynamic channel access mode and/or a semi-static channel access mode.

Supplement 21. The method according to supplement 7 or 14, wherein the channel access type includes a type of performing no channel detection.

Supplement 22. The method according to supplement 21, wherein the type of performing no channel detection is used for initializing occupied channels and/or used for sharing occupied channels.

Supplement 23. The method according to supplement 21, wherein the channel access type further includes a type of performing channel detection.

Supplement 24. The method according to supplement 14, wherein the uplink resource is configured by an RRC message, or the uplink resource (or the second signal) is scheduled by downlink control information (DCI) or a random access response (RAR), the DCI or RAR not including an information domain used for indicating a channel access type, and in a case where the first information does not indicate performing no channel detection, the terminal equipment transmits the second signal by using a predefined or preconfigured channel access type.

Supplement 25. The method according to supplement 24, wherein the predefined or preconfigured channel access type is a type of performing no channel detection, or the predefined or preconfigured channel access type is a type of performing channel detection.

Supplement 26. The method according to supplement 24, wherein the predefined or preconfigured channel access type is per at least one of the following: a system, a cell group, a cell, a carrier, a channel group, a bandwidth part (BWP), a channel, a beam, a physical channel/signal, or data carried by a physical channel/signal.

Supplement 27. The method according to supplement 14, wherein the uplink resource is configured by an RRC message, and when the first information does not indicate performing no channel detection, the terminal equipment transmits the second signal by using channel access type indicated by third information.

Supplement 28. The method according to supplement 27, wherein the third information is per at least one of the following: a system, a cell group, a cell, a carrier, a channel group, a bandwidth part (BWP), a channel, a beam, a physical channel/signal, or data carried by a physical channel/signal.

Supplement 29. The method according to supplement 14, wherein the uplink resource is configured by an RRC message, or the uplink resource (the second signal) is scheduled by downlink control information (DCI) or a random access response (RAR), the DCI or RAR not including an information domain indicating a channel access type;

the first information is used to indicate a channel access type, and the terminal equipment transmits the second signal by using a channel access type indicated by the first information.

Supplement 30. The method according to supplement 27 or 28, wherein the second signal is a physical uplink shared channel (PUSCH), and the first information and/or the third information are/is included in configuration information of a configured grant (CG).

Supplement 31. The method according to supplement 27 or 28, wherein the second signal is a sounding reference signal (SRS), and the first information or the third information is included in configuration information of the sounding reference signal (SRS).

Supplement 32. The method according to supplement 27 or 28, wherein the second signal is a physical random access channel (PRACH), and the first information or the third information is included in configuration information of the physical random access channel (PRACH).

Supplement 33. The method according to supplement 27 or 28, wherein the second signal is a physical uplink control channel (PUCCH), and the first information or the third information is included in configuration information of the PUCCH or configuration information of a scheduling request (SR) or configuration information of channel state information (CSI).

Supplement 34. The method according to supplement 1, wherein the uplink resource (or the second signal) is scheduled by DCI or an RAR, and when the first signal indicates performing no channel detection, the terminal equipment determines that the DCI or RAR scheduling the uplink resource does not include an information domain indicating a channel access type, and the terminal equipment does not perform channel detection before transmitting the second signal Supplement 35. The method according to supplement 1, wherein the uplink resource (or the second signal) is scheduled by DCI or an RAR, and when the first signal does not indicate performing no channel detection, according to fourth information, the terminal equipment determines an information domain indicating a channel access type and included in the DCI or RAR scheduling the uplink resource, the fourth information being at least used to indicate a channel access type that the DCI or RAR is able to indicate.

Supplement 36. The method according to supplement 35, wherein the terminal equipment transmits the second signal by using the channel access type indicated by the DCI or RAR, or, when the fourth information indicates one channel access type, the terminal equipment transmits the second signal by using the channel access type indicated by the fourth information.

Supplement 37. The method according to any one of supplements 1-36, wherein the method further includes:

transmitting a measurement result by the terminal equipment to the network device, the measurement result being per at least one of the following: a cell, a cell group, a channel, a channel group, a bandwidth part (BWP), or a beam.

Supplement 38. The method according to supplement 37, wherein the measurement result includes at least one of the following: a received signal strength, channel occupation information, information that channel detection needs to be performed, or information that channel detection needs not to be performed.

Supplement 39. The method according to supplement 37 or 38, wherein the terminal equipment transmits the measurement result when certain conditions are satisfied, the conditions including: a received signal strength and/or that channel occupation is greater than a first threshold, and/or the received signal strength and/or that channel occupation is less than a second threshold.

Supplement 40. A method for receiving an uplink signal, including:

transmitting a first signal by a network device to a terminal equipment, the first signal being at least used for the terminal equipment to determine whether to perform channel detection and/or how to perform channel detection before transmitting a second signal; and receiving by the network device the second signal transmitted by the terminal equipment by using an uplink resource.

Supplement 41. A terminal equipment, including a memory and a processor, the memory storing a computer program, and the processor being configured to execute the computer program to carry out the method for transmitting an uplink signal as described in any one of supplements 1-39.

Supplement 42. A network device, including a memory and a processor, the memory storing a computer program, and the processor being configured to execute the computer program to carry out the method for receiving an uplink signal as described in supplement 40.

What is claimed is:

1. An apparatus for transmitting an uplink signal, configured in a terminal equipment, the apparatus comprising:

a receiver configured to receive:

a radio resource control (RRC) message; and a downlink control information (DCI) or a random access response (RAR), the DCI and the RAR being used for scheduling an uplink transmission in a cell operating with a first shared spectrum where channel sensing is not mandatory;

a transmitter configured to transmit the uplink transmission; and processor circuitry configured to:

control, when first information for the cell operating with the first shared spectrum where channel sensing is not mandatory is absent in the received radio resource control message, to not perform channel access procedure for transmitting the uplink transmission in the cell operating with the first share spectrum where channel sensing is not mandatory, and control, when the first information for the cell operating with the first shared spectrum where channel sensing is not mandatory is present in the received radio resource control message, to perform channel access procedure for transmitting the uplink transmission in the cell operating with the first share spectrum where channel sensing is not mandatory, and according to information in the DCI or the RAR, to determine a type of the channel access procedure for transmitting the uplink transmission, wherein the first information is applicable for the first shared spectrum where channel sensing is not mandatory and not applicable for a second shared spectrum where channel sensing is mandatory, wherein the type of the channel access procedure includes:

a type 1 channel access procedure with channel sensing;

a type 2 channel access procedure with channel sensing; or a type 3 channel access procedure without channel sensing.

2. The apparatus according to claim 1, wherein the radio resource control message comprises broadcasted radio resource control message and/or dedicated radio resource control message for the terminal equipment, and the broadcasted radio resource control message comprises system information block.

3. The apparatus according to claim 1, wherein the first information is cell-specific or UE-specific.

4. The apparatus according to claim 1, wherein the first information is information per cell.

5. The apparatus according to claim 1, wherein the processor circuitry is further configured to:

control, when the radio resource control message does not include the first information for a cell, the terminal equipment does not perform channel access procedure for transmitting uplink transmission(s) of the cell, and control, when radio resource control message includes the first information for the cell, the terminal equipment performs channel access procedure for transmitting uplink transmission(s) of the cell.

6. The apparatus according to claim 1, wherein the radio resource control message includes second information used to indicate an operating band of a cell, the second information indicating a band index of the operating band of the cell, the operating band being identified by the band index is pre-defined as a licensed band or an unlicensed band.

7. The apparatus according to claim 6, wherein in a case where the operating band is a licensed band, the first information for the cell is absent; or, in a case where the operating band is an unlicensed band, the first information for the cell is optionally present.

8. The apparatus according to claim 1, wherein, the receiver is further configured to:

receive a fourth information carried by a radio resource control signaling, the fourth information configures types of channel access procedure which are capable of being indicated by the information contained in the DCI or the RAR.

9. The apparatus according to claim 1, wherein, the uplink transmission is PRACH, PUCCH, PUSCH, or SRS.

10. The apparatus according to claim 1, wherein, the transmitter is further configured to transmit measurement result; wherein the measurement result comprises received signal strength per beam.

11. An apparatus for receiving an uplink signal, configured in a network device, the apparatus comprising:

a transmitter configured to transmit:

a radio resource control (RRC) message; and a downlink control information (DCI) or a random access response (RAR), the DCI and the RAR being used for scheduling an uplink transmission; and a receiver configured to receive the uplink transmission transmitted by a terminal equipment by using an uplink resource; wherein, when first information for the cell operating with the first shared spectrum where channel sensing is not mandatory is absent in the received radio resource control message, the terminal equipment does not perform channel access procedure for transmitting the uplink transmission in the cell operating with the first share spectrum where channel sensing is not mandatory, and when the first information for the cell operating with the first shared spectrum where channel sensing is not mandatory is present in the received radio resource control message, the terminal equipment performs channel access procedure for transmitting the uplink transmission in the cell operating with the first share spectrum where channel sensing is not mandatory, and according to information in the DCI or the RAR, the terminal equipment determines a type of the channel access procedure for transmitting the uplink transmission, wherein the first information is applicable for the first shared spectrum where channel sensing is not mandatory and not applicable for a second shared spectrum where channel sensing is mandatory, wherein the type of the channel access procedure includes:

a type 1 channel access procedure with channel sensing;

a type 2 channel access procedure with channel sensing; or a type 3 channel access procedure without channel sensing.

12. A communication system, comprising:

a network device configured to:

transmit a radio resource control (RRC) message signal, transmit a downlink control information (DCI) or a random access response (RAR), the DCI and the RAR being used for scheduling an uplink transmission in a cell operating with a first shared spectrum where channel sensing is not mandatory, and
receive the uplink transmission; and
a terminal equipment configured to:
receive the radio resource control message signal,
receive the downlink control information or the random access response, and
transmit the uplink transmission,
control, when first information for the cell operating with the first shared spectrum where channel sensing is not mandatory is absent in the received radio resource control message, to not perform channel access procedure for transmitting the uplink transmission in the cell operating with the first share spectrum where channel sensing is not mandatory, and
control, when the first information for the cell operating with the first shared spectrum where channel sensing is not mandatory is present in the received radio resource control message,
to perform channel access procedure for transmitting the uplink transmission in the cell operating with the first share spectrum where channel sensing is not mandatory, and according to information in the DCI or the RAR, to determine a type of the channel access procedure for transmitting the uplink transmission, wherein the first information is applicable for the first shared spectrum where channel sensing is not mandatory and not applicable for a second shared spectrum where channel sensing is mandatory,
wherein the type of the channel access procedure includes:
a type 1 channel access procedure with channel sensing;
a type 2 channel access procedure with channel sensing; or
a type 3 channel access procedure without channel sensing.

13. The apparatus according to claim 8, wherein, the types of channel access procedure that are configurable by the fourth information include a type with channel sensing and a type without channel sensing.

14. The apparatus according to claim 8, wherein the types of channel access procedure that are configurable by the fourth information include a type 1 channel access procedure or a type 2 channel access procedure or a type 3 channel access procedure.

15. The apparatus according to claim 1, wherein the first information is for a cell operating in frequency range from 52.6 GHz to 71 GHz.

* * * * *